United States Patent
Tidemand-Lichtenberg et al.

(10) Patent No.: US 9,410,846 B2
(45) Date of Patent: Aug. 9, 2016

(54) MULTI-CHANNEL UP-CONVERSION INFRARED SPECTROMETER AND METHOD OF DETECTING A SPECTRAL DISTRIBUTION OF LIGHT

(71) Applicant: Danmarks Tekniske Universitet, Lyngby (DK)

(72) Inventors: Peter Tidemand-Lichtenberg, Hørsholm (DK); Jeppe Seidelin Dam, Kgs. Lyngby (DK); Christian Pedersen, Hvidovre (DK)

(73) Assignee: Danmarks Tekniske Universitet, Lyngby (DK)

( * ) Notice: Subject to any disclaimer, the term of this patent is extended or adjusted under 35 U.S.C. 154(b) by 0 days.

(21) Appl. No.: 14/900,329

(22) PCT Filed: Jul. 9, 2014

(86) PCT No.: PCT/DK2014/050215
§ 371 (c)(1),
(2) Date: Dec. 21, 2015

(87) PCT Pub. No.: WO2015/003721
PCT Pub. Date: Jan. 15, 2015

(65) Prior Publication Data
US 2016/0153834 A1 Jun. 2, 2016

(30) Foreign Application Priority Data
Jul. 9, 2013 (EP) ..................... 13175711

(51) Int. Cl.
*G01J 3/02* (2006.01)
*G01J 3/28* (2006.01)

(52) U.S. Cl.
CPC ............. *G01J 3/0297* (2013.01); *G01J 3/0294* (2013.01); *G01J 3/2803* (2013.01); *G01J 3/2823* (2013.01)

(58) Field of Classification Search
CPC ........................................................ G01J 3/02
See application file for complete search history.

(56) References Cited

FOREIGN PATENT DOCUMENTS

WO  WO 2010/006985 A2  1/2010
WO  WO 2012/129089 A1  9/2012

OTHER PUBLICATIONS

Chou, M.H. et al., "Multiple-channel wavelength conversion by use of engineered quasi-phasematching structures in $LiNbO_3$ waveguides" Optics Letters, Aug. 15, 1999, pp. 1157-1159, vol. 24, No. 16.

(Continued)

*Primary Examiner* — David Porta
*Assistant Examiner* — Hugh H Maupin
(74) *Attorney, Agent, or Firm* — Knobbe Martens Olson & Bear LLP (57) ABSTRACT

A multi-channel infrared spectrometer for detecting an infrared spectrum of light received from an object. The spectrometer comprises a wavelength converter system comprising a nonlinear material and having an input side and an output side. The wavelength converter system comprises at least a first up-conversion channel and a second up-conversion channel, and is arranged such that light traversing the wavelength converter system at different angles in the nonlinear material is imaged into different positions in an image plane. The first up-conversion channel is configurable for phase-matching infrared light in a first input wavelength range incident on the first side and light in a first output wavelength range output on the second side, and correspondingly, the second up-conversion channel is configurable for phase-matching infrared light in a second input wavelength range incident on the first side into light in a second output wavelength range output on the second side. The spectrometer further comprises a demultiplexer configured for demultiplexing light in the first up-conversion channel and light in the second up-conversion channel. The demultiplexer is located on the first side or the second side of the wavelength converter system. Finally, the spectrometer comprises a spatially resolved detector arranged in the image plane to detect light in the first output wavelength range and second output wavelength range output of the wavelength converter system.

14 Claims, 4 Drawing Sheets

(56) References Cited

OTHER PUBLICATIONS

Dam, Jeppe Seidelin et al., "A simple model for 2-D upconversion of incoherent light" Proceedings of SPIE, Jan. 2011, pp. 791714-1-791714-4, vol. 7917.

Dam, Jeppe Seidelin et al., "Room temperature mid-IR single photon spectral imaging" Nature Photonic, 2012, DTU Fotonik, Technical University of Denmark.

Dam, Jeppe Seidelin et al., "High resolution mid-infrared spectroscopy based on frequency upconversion" Proceedings of SPIE, Feb. 2013, pp. 86040S-1-86040S-6, vol. 8604.

Griffiths, Peter R. et al., "Fourier Transform Infrared Spectrometry" Second Edition, 2007.

Hu, Qi et al., "High-resolution mid-IR spectrometer based on frequency upconversion" Optics Letters, Dec. 15, 2012, pp. 5232-5234, vol. 37, No. 24.

Sanders, Nicolai et al., "Multispectral mid-infrared imaging using frequency upconversion" Proceedings of SPIE, Feb. 2013, pp. 86040R-1-86040R-6, vol. 8604.

International Search Report for PCT/DK2014/050215 dated Jan. 7, 2015.

MULTI-CHANNEL UP-CONVERSION INFRARED SPECTROMETER AND METHOD OF DETECTING A SPECTRAL DISTRIBUTION OF LIGHT

CROSS REFERENCE TO RELATED APPLICATIONS

This application is a U.S. National Phase Application of PCT International Application Number PCT/DK2014/050215, filed on Jul. 9, 2014, designating the United States of America and published in the English language, which is an International Application of and claims the benefit of priority to European Patent Application No. 13175711.4, filed on Jul. 9, 2013. The disclosures of the above-referenced applications are hereby expressly incorporated by reference in their entireties.

FIELD OF THE INVENTION

The present invention relates to spectral analysis of infrared electromagnetic radiation. More specifically, the invention relates to an infrared spectrometer adapted for up-conversion of the infrared radiation to shorter wavelengths.

BACKGROUND OF THE INVENTION

Spectroscopy is a well-established analytic tool for a vast number of applications, such as inspection of food items, etc. Spectroscopy in the infrared range is particularly relevant, due to the distinct molecular vibration bands found in this range. However, low-noise detection of infrared radiation is challenging due to the thermal background radiation. The most widely used infrared spectrometer is the Fourier Transform Infrared (FTIR) spectrometer.

Common FTIR spectrometers must scan a reference mirror with very high precision on a centimeter scale, requiring an extremely high precision mechanical system, with associated high costs and generally a low tolerance for vibrations. Furthermore, detection of the radiation is commonly performed with cryogenically cooled detectors—adding both operating cost and complexity.

A mid-IR spectrometer based on frequency up-conversion was described in "High-resolution mid-IR spectrometer based on frequency upconversion", Qi Hu, et al., Optics Letters, 37(24), pp. 5232-5234, 2012. A wavelength range from about 2.89 µm-3.00 µm was up-converted using three different temperatures of the nonlinear crystal to phase-match different wavelength ranges. A drawback of temperature tuning the nonlinear crystal is that slow temperature changes must be used to avoid damage to coatings on end faces of the nonlinear crystal, which is otherwise a problem due to different thermal expansion coefficients of crystal and coating. Thus, acquisition time of a full spectrum in the described spectrometer will be on the order of minutes. Furthermore, a relatively narrow wavelength range was detected.

Hence, an improved infrared spectrometer would be advantageous, and in particular an infrared spectrometer having relaxed mechanical tolerances and/or less stringent requirements on cooling would be advantageous.

OBJECT OF THE INVENTION

It is a further object of the present invention to provide an alternative to the prior art.

It may further be seen as an object of variants of the present invention to improve signal to noise performance in spectrometer measurements.

In particular, it may be seen as an object of the present invention to provide a infrared spectrometer that solves the above mentioned problems of the prior art with no or few mechanically moving parts, and/or having improved noise characteristics.

SUMMARY OF THE INVENTION

Thus, the above-described object and several other objects are intended to be obtained in a first aspect of the invention by providing an infrared spectrometer for detecting an infrared spectrum of light received from an object. The spectrometer comprises a wavelength converter system comprising a non-linear material and having an input side and an output side. The wavelength converter system comprises at least a first up-conversion channel and a second up-conversion channel. The wavelength converter system is arranged such that light traversing the wavelength converter system at different angles in the nonlinear material is imaged into different positions in an image plane. The first up-conversion channel is configurable for phase-matching infrared light in a first input wavelength range incident on the first side and light in a first output wavelength range output on the second side. Concurrently, the second up-conversion channel is configurable for phase-matching infrared light in a second input wavelength range incident on the first side into light in a second output wavelength range output on the second side. The spectrometer further comprises a demultiplexer configured for demultiplexing light in the first up-conversion channel and light in the second up-conversion channel. The demultiplexer is located on the first side of the wavelength converter system. Finally, the spectrometer comprises a spatially resolved detector arranged in the image plane to detect light in the first output wavelength range and second output wavelength range output of the wavelength converter system. In this way, the infrared light received from the object may be up-converted concurrently in the multiple up-conversion channels to up-converted signals, which may more conveniently be detected with available detectors. For instance, the up-converted signal may be a visible signal or a near-infrared (NIR) signal, e.g. for detection with a CCD camera or another NIR/visible detector system. By using two or more up-conversion channels, an extended input wavelength range may be accepted and converted for detection. As the phase-matching condition of the nonlinear material is generally dependent on an angle of the incoming radiation relative to an optical axis of the nonlinear material, the up-converted signal received in different radial positions on the detector will correspond to different spectral components of the input signal. The inventors have surprisingly found that an extended input wavelength range may be covered by a small number of up-conversion channels. For instance, an input wavelength range from 5-10 µm may be covered by only about 4-5 channels.

Thus, in some variants, an improved signal to noise performance in spectrometer measurements is obtained by simultaneously measuring in multiple channels, wherein measurements from one or more channels may act as reference signals for measurements from other channels.

In the context of the present invention, a demultiplexer is to be understood as a means for demultiplexing, or separating, the output from the up-conversion channels from each. More specifically, the demultiplexer may in some embodiments be implemented by providing mixing laser light along different beam paths, having different phase-matching conditions, within the nonlinear crystal. In other embodiments, the demultiplexer may analogously be implemented by providing the infrared light signals along different beam paths.

In other variations, which may be useful in connection with embodiments of the present invention, the demultiplexer may be implemented as a temporal switching between two or more up-conversion channels. Alternatively, the demultiplexer may be implemented as a spectral filtering of the up-converted signals, i.e. on the second side of the wavelength converter system.

In an embodiment of the invention, the first input range and the second input wavelength range overlap. In this way, an extended and continuous spectrum of the input wavelength range may be recorded.

In an embodiment of the invention, the first and second input wavelength ranges are at least partially non-overlapping.

Up-conversion is in the context of this text to be understood as the process of frequency-converting light to a higher frequency, i.e. shorter wavelength. Thus, it is understood that wavelengths in the first and second input wavelength ranges are longer than wavelengths in the first and second output wavelength ranges, respectively. Note in this respect that since the first and second output ranges are demultiplexed before or during detection, the output ranges are not necessarily distinct, i.e. distinct first and second wavelength components in the input signal may be converted to the same output wavelength component, but in separate channels.

Phase-matching should in the context of this document be understood as either true phase-matching or quasi phase-matching, e.g. as obtainable through periodic poling.

Embodiments of such channels are set out below, but includes spatially overlapping or non-overlapping regions of different phase-matching types e.g. for different light polarizations.

In a broader aspect that may be useful for embodiments of the present invention, additional wavelength up-conversion channels could be understood in a broad sense, not solely restricted to a physical channel partly or fully separated from other channels. Such additional channels may be included as e.g. temporal switching of phase-matching conditions.

The skilled person will realize that a wide range of nonlinear materials are suitable for use in the infrared spectrometer. Selection criteria include the nonlinear coefficient at the respective wavelengths, the absorption, and the obtainable phase-matching properties. Specific choices are various non-linear crystal, such as periodically-poled Lithium Niobate (PP:LN), $AgGaS_2$, OP:GaAs, OP:GaN, BNA, and DAST.

In an embodiment of the invention, the first input wavelength range is in the range of 1.5 µm-300 µm, such as 2 µm-5 µm, 5-10 µm, 10 µm-30 µm, or 30 µm-300 µm.

In an embodiment of the invention, the first output wavelength range is in the range of 0.3 µm-1.2 µm, or 0.8 µm-2.2 µm, such as 0.4 µm-1.1 µm or 0.9 µm-2.0 µm, or even 0.45 µm-0.7 µm or 1.0 µm-1.8 µm.

In an embodiment of the invention, the wavelength converter system is a continuous wave CW converter system. In this way, the SNR may be improved when detecting incoherent light. Furthermore, the use of a CW converter system avoids timing issues e.g. when detecting a pulsed signal. An example of a suitable CW wavelength converter system is described in Hu, et al.

In an embodiment of the invention, the wavelength up-conversion channels are arranged in parallel. By arranging the first and second up-conversion channels side-by-side, a particularly simple demultiplexer may be used, since the output light from the first channel may be imaged spatially separated from the output light from the second channel onto the detector. Thus in an embodiment, light detected in one region of the detector will stem from the first up-conversion channel, while light detected in another region of the detector will stem from the second up-conversion channel. Note in this context that the term "parallel" is to be understood as arranged in a side-by-side manner, but not necessarily that light in the two channels propagate strictly along two parallel lines in a geometrical sense. For instance, the first and second up-conversion channels may cross each other at a low angle, In one embodiment, the wavelength up-conversion channels are comprised as periodically poled regions of the nonlinear material, wherein the poling period differs from the first up-conversion channel to the second up-conversion channel.

According to another aspect, which may be useful in combination with embodiments of the invention, the demultiplexer is adapted to shift the nonlinear material in a transverse direction, when compared to an optical axis, so as to insert the first and/or the second periodically poled region into the optical path.

In an embodiment of the invention, the wavelength up-conversion channels are arranged in series. By arranging the first and second up-conversion channels one-after-another, demultiplexing may be performed after the up-conversion. Thus, the need for infrared optics may be alleviated. Furthermore, the spectrometer may be made more energy efficient, since the full mixing laser power may be used for all up-conversion channels. Finally, demultiplexing may be made particularly simple in this embodiment, e.g. by using a grating after conversion.

According to another aspect, which may be useful in combination with embodiments of the invention, additional wavelength up-conversion channels are sequentially formable in time by reconfiguring the phase-matching condition, and wherein the nonlinear material may be reconfigured from forming the first up-conversion channel to the second up-conversion channel in less than 30 s, such as less than 20 s, or even less than 10 s. Thus, reconfiguration is preferably not by temperature tuning, as this process generally has a long transient period from one temperature setting until the nonlinear material is stabilized at another temperature setting. Typically, the nonlinear material may be tuned with around 10 degree centigrade per minute.

According to another aspect, which may be useful in combination with embodiments of the invention, the nonlinear material is rotatably mounted in the wavelength converter system, such that first additional wavelength up-conversion channel is formable when the nonlinear material is oriented in a first rotational position and second additional wavelength up-conversion channel is formable when the nonlinear material is oriented in a second rotational position.

According to another aspect, which may be useful in combination with embodiments of the invention, the nonlinear material is displaceably mounted in the wavelength converter system, such that the nonlinear material may be displaced transversely with respect to an optical axis of the converter system, and wherein a first transverse position corresponds to a first phase-matching condition and a second transverse position corresponds to a second phase-matching condition. In this way, a first group of up-conversion channels may be formed by placing the nonlinear material in the first transverse position and a second group of up-conversion channels may be formed by placing the nonlinear material in the second transverse position. The associated mechanical tolerances of moving the nonlinear material are much less strict than those of the reference mirror of an FTIR spectrometer, in that a transverse size of the light beams within the nonlinear material may be made relatively large, i.e. on the order of hundred or even hundreds of micrometers.

In an embodiment of the invention, the wavelength converter system comprises a mixing laser configured for generating mixing laser light within the nonlinear material, the mixing laser light having a mixing laser wavelength, wherein the nonlinear material is configurable to phase-match the mixing laser wavelength, the first input wavelength range and the first output wavelength range, thereby forming the first wavelength up-conversion channel.

In an embodiment of the invention, the difference in phase-matching condition between the first and the second up-conversion channels are achieved by one or more of the following: a difference in propagation angle of the mixing laser relative to a crystal axis of the nonlinear crystal, a different state of polarization, or a different quasi-phase matching.

In another aspect, which may be useful in combination with embodiments of the invention, the mixing laser wavelength is selectable, and wherein groups of wavelength up-conversion channels are dynamically formed by temporally changing the mixing laser wavelength. In one embodiment, the mixing laser is tunable, and the mixing laser wavelength is changed by tuning the laser.

In one embodiment, the mixing laser is switchable between different emission wavelengths, and the mixing laser wavelength is changed by switching the laser.

In an alternative embodiment, mixing laser light is generated by a first mixing laser and a second mixing laser, configured for generating mixing laser light with a first and a second mixing laser wavelength, respectively.

In another aspect, which may be useful in combination with embodiments of the invention, groups of wavelength up-conversion channels are dynamically formed by temporally switching between the mixing laser light with the first mixing laser wavelength and the mixing laser light with the second mixing laser wavelength.

In an embodiment of the invention, the spatially resolved detector comprises a two-dimensional detector array.

In an embodiment of the invention, the spatially resolved detector comprises a linear detector array.

In an embodiment of the invention, the spatially resolved detector comprises a scanning slit system.

In an embodiment of the invention, the spatially resolved detector comprises a movable point detector.

The invention is particularly, but not exclusively, advantageous for obtaining an infrared spectrometer useable for industrial use, e.g. having a high tolerance for vibration, being cost efficient, and/or having no need for cryogenic cooling of the detector.

The invention further relates to a method of detecting a spectral distribution of input light within an extended input wavelength range, according to a second aspect of the invention. The method comprises providing at least a first and a second wavelength up-conversion channel. The first wavelength up-conversion channel is configured for phase-matching a first input wavelength range and enabling wavelength conversion of the first input wavelength range into a first output wavelength range. Analogously, the second wavelength up-conversion channel is concurrently configured for phase-matching a second input wavelength range and enabling wavelength conversion of the second input wavelength range into a second output wavelength range. The method further comprises converting light in a first sub-range of the extended input wavelength range comprising wavelengths in the first input wavelength range into a first output signal in the first wavelength up-conversion channel, and converting light in a second sub-range of the extended input wavelength range comprising wavelengths in the second input wavelength range into a second output signal in the second wavelength up-conversion channel. The method even further comprises detecting a spatial intensity distribution of the first output signal and the second output signal, respectively, with a spatially resolved detector. Finally, the method comprises calculating the spectral distribution in the first sub-range from the detected spatial intensity distribution of the first output signal, and calculating the spectral distribution in the second sub-range from the detected spatial intensity distribution of the second output signal. Additional wavelength up-conversion channels may be provided e.g. to span a larger input wavelength range.

An "extended" input wavelength range is in this context to be understood as a wavelength range which is too wide to be phase-matched in its entirety by a single configuration of a nonlinear material, i.e. preserving temperature, propagation direction, mixing light wavelength, etc.

In an embodiment of the inventive method, the first and second input wavelength ranges are at least partially non-overlapping.

In an embodiment of the invention, the method further comprises demultiplexing light in the first sub-range and in the second sub-range so that light in the first sub-range is selectively coupled to the first wavelength up-conversion channel, and light in the second sub-range is selectively coupled to the second wavelength up-conversion channel.

In an embodiment of the invention, the method further comprises demultiplexing the first output signal and the second output signal so that the output signals are directed to separate detector regions.

This aspect of the invention is particularly, but not exclusively, advantageous in that the method according to the present invention may be implemented by the novel infrared spectrometer according to the first aspect.

The first and second aspect of the present invention may be combined with each other. These and other aspects of the invention will be apparent from and elucidated with reference to the embodiments described hereinafter.

BRIEF DESCRIPTION OF THE FIGURES

The multi-channel infrared spectrometer according to the invention will now be described in more detail with regard to the accompanying figures, wherein same reference numerals are used to designate identical or corresponding features. The figures show one way of implementing the present invention and is not to be construed as being limiting to other possible embodiments falling within the scope of the attached claim set.

DETAILED DESCRIPTION OF AN EMBODIMENT

Figure 1:
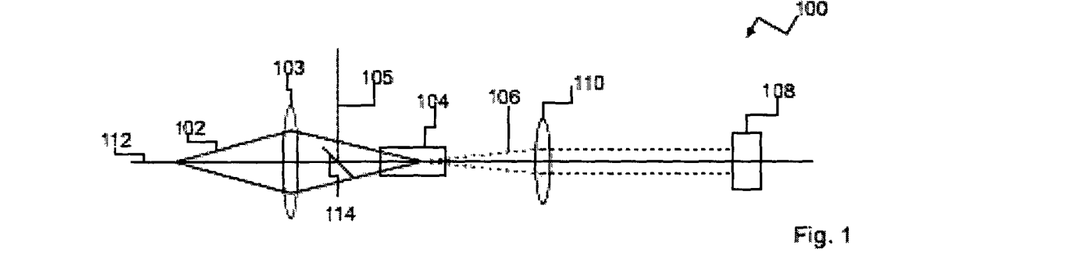
FIG. 1 shows a single-channel spectrometer.
Figure 10:
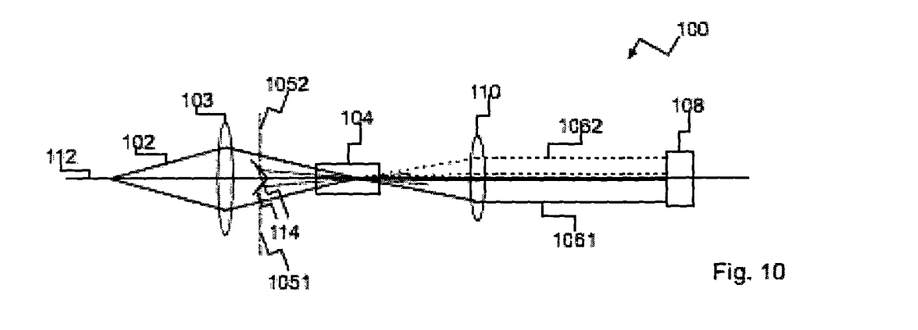
FIG. 10 illustrates another embodiment of the invention, which resembles the one shown in FIG. 5.

FIG. 1 schematically illustrates an implementation of a single-channel spectrometer 100. Infrared light 102 from an object is focused onto a nonlinear material 104, e.g. by a suitable infrared lens 103. Alternatively, focusing may also be provided by an infrared imaging system 103, comprising multiple infrared lenses—as illustrated in FIG. 10. Within the nonlinear material 104, the infrared light 102 is brought to interact with mixing light 105 from a mixing laser (not shown). In this way, up-converted light 106 is generated and imaged onto a detector 108 by a lens 110. The mixing light 105 is here illustrated to be coupled into the path of infrared light 102 along the optical axis 112 by means of a reflector 114, here in the form of a partly reflecting mirror. As described in Hu, et al., phase-matching conditions within the nonlinear material 104 will depend on an angle between a propagation direction of the incoming infrared light and an axis of the nonlinear material. Thus, for a given angle, a spectral component of the infrared light, corresponding to the particular phase-matching for that angle will be selected for up-conversion by the nonlinear material. Consequently, the up-converted radiation detected at the corresponding region of the detector 108 is known to have arisen from the given spectral component in the infrared light 102. In this way, spectral information of the infrared light 102 may be recorded directly by recording the spatial distribution of the up-converted light 106 at the detector 108. Since the up-converted 106 light is to be detected, and not the infrared light 102, the selection of available suitable detectors is much improved, as compared to the selection of infrared detectors.

Figure 2:
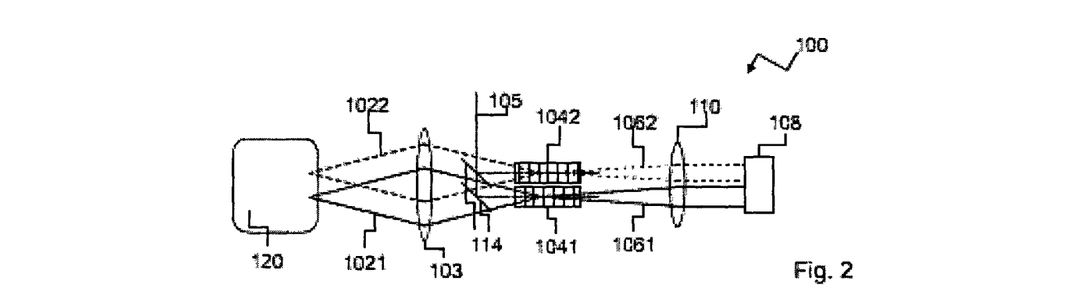
FIG. 2 shows an embodiment of the multi-channel spectrometer according to the invention, using demultiplexing before the wavelength converter system.

FIG. 2 illustrates an embodiment of a spectrometer 100 comprising multiple channels, here illustrated with two channels. Each of the channels relates to the single channel illustrated in FIG. 1. Therefore, only the differences between the two spectrometers 100 will be discussed here. In this embodiment, the infrared light 102 is spatially demultiplexed in a demultiplexer 120, such that infrared light having wavelength components in a first input wavelength range is spatially separated from infrared light having wavelength components in a second input wavelength range. In this way, a first infrared input signal 1021 and a second infrared input signal 1022 is formed. Each of the infrared input signals 1021, 1022 are focused onto nonlinear materials 1041, 1042—here illustrated as separate, periodically poled crystals—forming first and second up-conversion channels. Focusing is here illustrated using a common lens 103, but in an alternative variant, separate lenses may be used for each channel—as illustrated in FIG. 10. However, the first and second up-conversion channels may also be provided as periodically poled regions in a single nonlinear material. It is seen that the poling period differs for the two up-conversion channels, such that the phase-matching conditions also differ. Thus, the first input infrared signal 1021 is up-converted into a first output signal 1061 and image onto a first region of the detector 108, and the second input infrared signal 1022 is up-converted into a second output signal 1062 and imaged onto a second region of the detector 108. The skilled person will readily understand that the two detector regions could also be comprised by two separate detectors without deviating from the scope of the invention.

Figure 3:
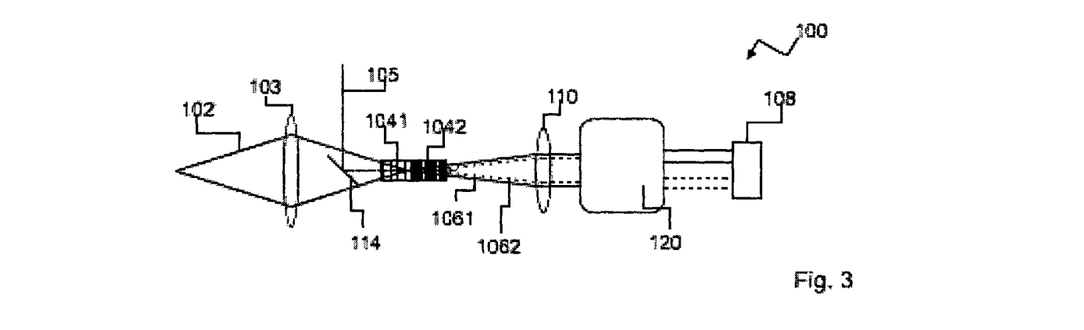
FIG. 3 shows an embodiment of the multi-channel spectrometer according to the invention, using demultiplexing after the wavelength converter system.

FIG. 3 illustrates a variant of the spectrometer which may be useful in combination with embodiments according to the invention, where the first and second up-conversion channels are provided as two nonlinear materials arranged in series, here in the form of periodically poled crystals 1041, 1042. The embodiment corresponds to that of FIG. 2, and as such only the differences between the two embodiments are described here. In this embodiment, the infrared light 102 is not demultiplexed but rather the up-converted signals 1061, 1062. Thus, the infrared light 102 within the wavelength converter system and the up-converted light 1061, 1062 therefrom represents the full measurement range of the spectrometer. Only after the up-converted light is collimated, e.g. with lens 110, the up-converted light is spatially separated in a demultiplexer 120. The demultiplexer 120 may for instance be realised as a dichroic or spatial filter or by temporally filtering between the outputs of the different up-conversion channels.

Figure 4:
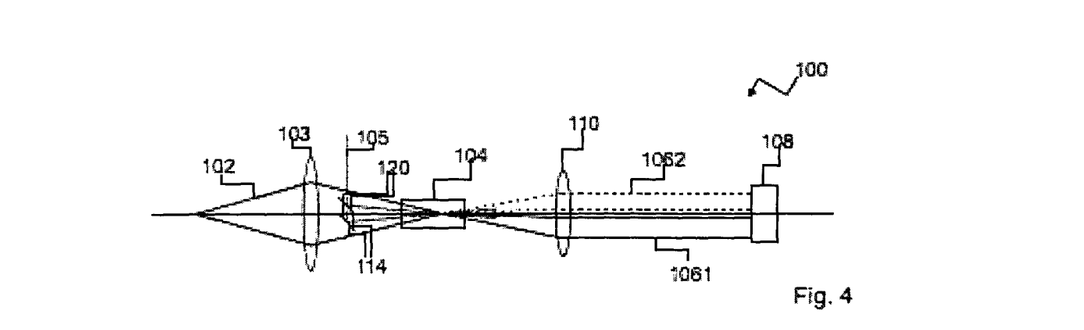
FIG. 4 shows an embodiment of the multi-channel spectrometer according to the invention, using demultiplexing by multiple mixing light beams.

FIG. 4 illustrates an embodiment of the multi-channel infrared spectrometer according to the invention wherein the angular dependence of the phase-matching conditions within the nonlinear material 104 is used to form different up-conversion channels. This is achieved by propagating the mixing light 105 along multiple paths within the nonlinear material 104. In this way, different spectral ranges of the infrared light 102 are matched by the different phase-matching conditions along the different paths of the mixing light—so in this embodiment, the coupling mirrors 114 form the demultiplexer 120. The other features of this embodiment correspond to those described in connection with FIGS. 1-3, for which reason only the differences were described here.

Figure 5:
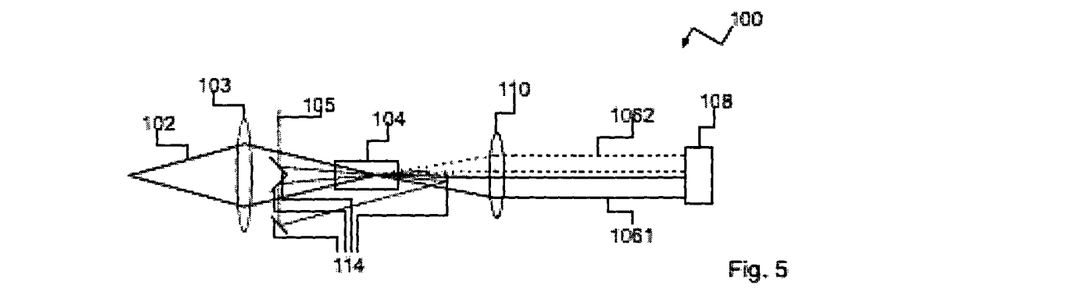
FIG. 5 shows another embodiment of the multi-channel spectrometer according to the invention, using demultiplexing by multiple mixing light beams.

FIG. 5 illustrates an embodiment of the inventive spectrometer, corresponding to the embodiment shown in FIG. 4. In this embodiment, the mixing laser light 105 is made to traverse the nonlinear material 104 multiple times (here two), and in different angles relative to the optical axis of the nonlinear material. To achieve this, multiple reflectors 114 are arranged around the nonlinear material 104. This embodiment illustrates another way of utilising the angular dependence of the phase-matching conditions within the nonlinear material 104 to form the different up-conversion channels. As in FIG. 4, the demultiplexer is implemented by the placement of the reflectors so as to form the separate up-conversion channels.

Figure 6:
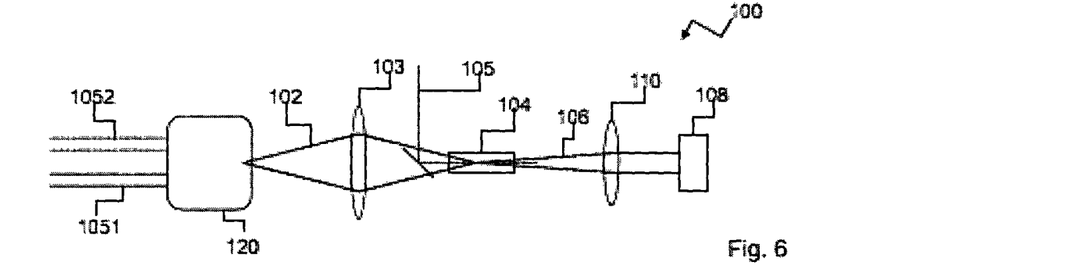
FIG. 6 shows an embodiment of the multi-channel spectrometer according to the invention, using multiple mixing wavelengths.

FIG. 6 illustrates an embodiment of the infrared spectrometer according to the invention, wherein the up-conversion channels are formed by use of different wavelengths of mixing light, here illustrated as a first mixing light 1051 and a second mixing light 1052.

One approach is to temporally vary the wavelength of the mixing light. In this way, the phase-matching condition is changed by changing the mixing light wavelength within the nonlinear material 104. By correspondingly time-gating the detector and the mixing light in a time period, the spectral information of the infrared light 102 may be collected over a number of such time periods. The demultiplexer may here be a time-gating switch between the first and second mixing light 1051, 1052, e.g. originating from separate mixing lasers at the respective mixing light wavelengths. Alternatively, if a tunable mixing laser is used, demultiplexing may be performed by a computer (not shown) controlling the wavelength of the laser and collecting data from the detector 108.

FIG. 6 may also be seen to illustrate an embodiment, wherein multiple mixing light wavelengths is coupled into the nonlinear material 104 simultaneously, and demultiplexing be performed by spectral separation of the up-converted output, e.g. with a grating. Such multiple mixing light wavelengths may e.g. be generated by multiple mixing lasers, or by a laser emitting from multiple laser lines simultaneously.

Figure 7:
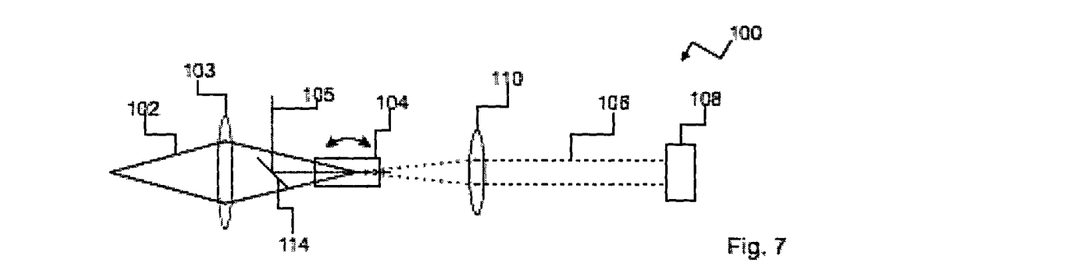
FIG. 7 shows an embodiment of the multi-channel spectrometer according to the invention, using angle tuning to form temporally separated conversion channels

FIG. 7 shows an embodiment of the infrared spectrometer using a technique which may be useful in combination with embodiments of the invention. As in the embodiments of FIGS. 4 and 5, this embodiment uses different propagation angles of the mixing light 105 through the nonlinear material 104 to select a phase-matching condition. In this case, the nonlinear material 104 is rotatably mounted, so that a rotation of the nonlinear material directly changes the angle. By rotating the nonlinear material 104 between e.g. two rotational positions, the first and second up-conversion channel may be formed sequentially in time. The number of channels may easily be increased by using more rotational positions. In this embodiment, the demultiplexer is the rotational mount of the nonlinear material 104, which may selectively couple the infrared light into the first up-conversion channel, the second up-conversion channel, and any other up-conversion channels. Detection of light from the respective up-conversion channels may then be performed by time-gated detection while the nonlinear material 104 dwells in the respective rotational position. Thus, light incident on the detector 108 at any given time will only be the up-converted light corresponding to one channel. The skilled person will realize that a continuum of channels may be achieved in this way by scanning the rotational position of the nonlinear material 104.

Figure 8:
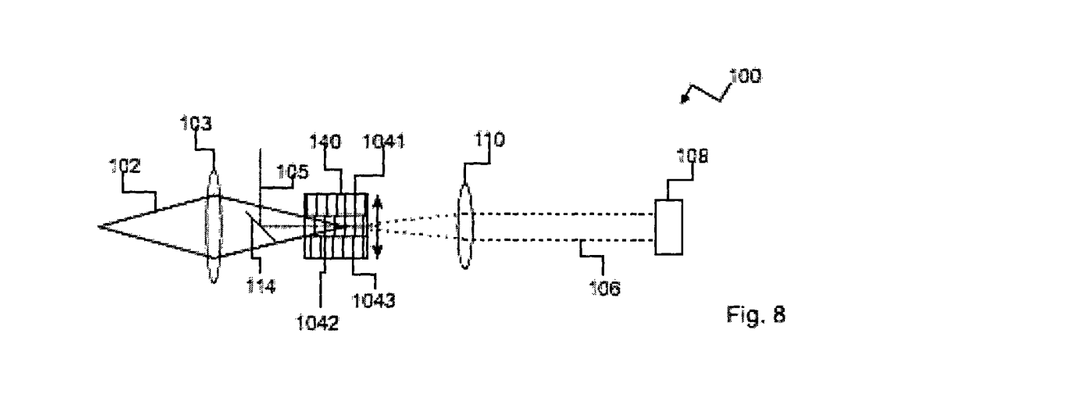
FIG. 8 shows an embodiment of the multi-channel spectrometer according to the invention, using temporally separated conversion channels.

FIG. 8 illustrates another technique that may be useful in combination with embodiments of the infrared spectrometer according to the invention. In this case, the nonlinear material 104 comprises multiple regions (here three are illustrated, in the form of periodically poled regions 1041, 1042, 1403), each having different phase-matching conditions. Each region may correspond to a single up-conversion channel and be selectable by transverse translation of the nonlinear material 104. In this way, each channel may be formed one at a time, as also described above for the embodiment of FIGS. 6 and 7. Thus, the demultiplexer is the translational mount of the nonlinear material 104 in this embodiment.

Figure 9:
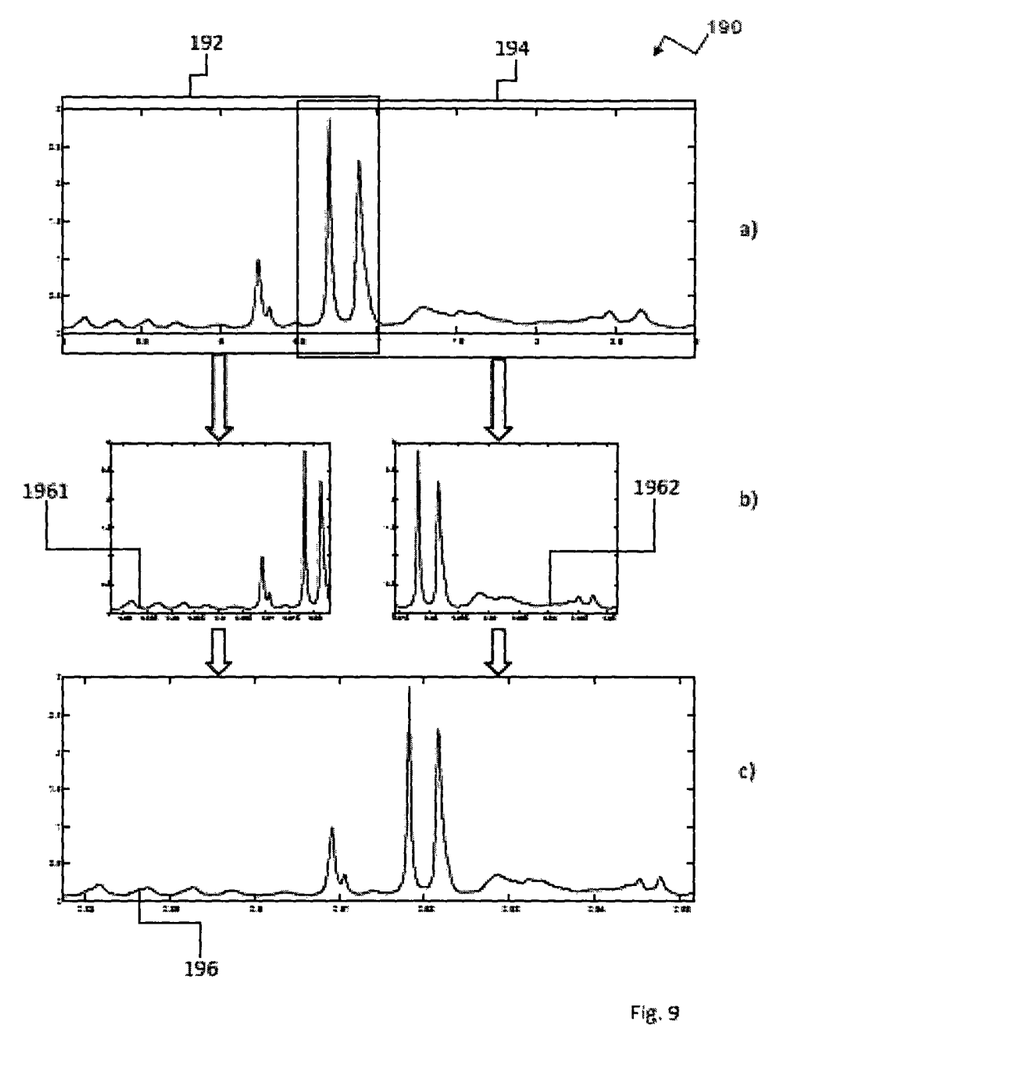
FIG. 9 shows a sample spectrum.

FIG. 9 illustrates the method of detecting a spectral distribution according to the invention, here using a theoretical absorbance spectrum of a polystyrene film. The spectrum to be recorded 190 is illustrated in FIG. 9a, and is seen to span 5-9 µm. Indicated with dashed lines are the ranges corresponding the first input wavelength range 192 and the second input wavelength range 194. It is seen that there is an overlap between the two input ranges, so as to aid in stitching together the recorded sub-spectra later. FIG. 9b shows the two sub-spectra 1961, 1962 of the converted light from the first input range 1961 and the second input range 1962, respectively. FIG. 9c shows the result of the final step of assembling the sub-spectra 1961, 1962 to form a single spectrum 196. The inventors have made a measurement corresponding to this theoretical result. For the measurement, an $AgGaS_2$-crystal was used for the up-conversion. A mixing laser light field of only about 1.5 W optical power was recirculated through the crystal. To record the up-converted light, an integration time of 1 sec per channel was used. Temporal demultiplexing was used, so that each channel was recorded separately in time.

FIG. 10 illustrates another embodiment of the invention, which resembles the one shown in FIG. 5. Thus, only differences between the two embodiments will be described here. In this embodiment, both a first mixing laser 1051 and a second mixing laser 1052 are arranged to provide mixing laser light in the nonlinear crystal 104. The mixing laser light 1051, 1052 may have the same wavelength or may have different wavelengths, depending on the phase matching condition to be achieved. Likewise, the first mixing laser light 1051 is launched at a first mixing laser light angle into the crystal 104, and the second mixing laser light 1052 at a second mixing laser light angle, where the first and second angles may be equal, or may differ. In the figure, the two angles are shown to be numerically equal, but with different signs, to provide two up-conversion channels. More than two mixing lasers may also be arranged to provide multiple up-conversion channels.

Figure 11:
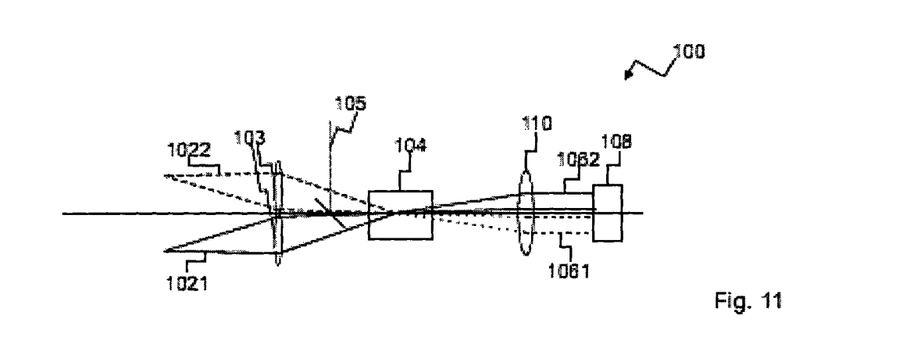
FIG. 11 illustrates another embodiment of the invention, where the two up-conversion channels are formed by difference in propagation angle within the nonlinear crystal 104, like also shown e.g., in FIG. 10.

FIG. 11 illustrates another embodiment of the invention, where the two up-conversion channels are formed by difference in propagation angle within the nonlinear crystal 104, like also shown, e.g. in FIG. 10. However, in this case, only a single mixing laser light beam 105 propagates in the nonlinear crystal, while the infrared light signal 1021, 1022 is made to propagate along two different paths, and thereby two different angles within the crystal. Here, it is illustrated that he infrared light signals 1021, 1022 are focused into the crystal with separate lenses 103. However, focusing may in other variations be provided by a single lens, as illustrated in FIG. 2, or by one or more infrared imaging systems each comprising multiple lenses. The two up-conversion channels may have identical or different phase match conditions, such that the first input wavelength range and the second input wavelength range may be non-overlapping, or overlap to a smaller or larger degree.

For instance, in an embodiment, the first infrared light signal 1021 may come from an object to be characterized, while the second infrared light signal 1022 may be a reference signal used to correct the measured spectrum of the first infrared light signal 1021, e.g. with regards to infrared source fluctuations, mixing laser fluctuations, fluctuations in the nonlinear crystal 104, or fluctuations arising from the detector 108. In such an embodiment, it is desirable that the two up-conversion channels have substantially coinciding input wavelength ranges.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference numerals in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. Infrared spectrometer for detecting an infrared spectrum of light received from an object, comprising:
   a wavelength converter system comprising a nonlinear material and having an input side and an output side, the wavelength converter system comprising at least a first up-conversion channel and a second up-conversion channel, the wavelength converter system being arranged such that light traversing the wavelength converter system at different angles in the nonlinear material is imaged into different positions in an image plane, the first up-conversion channel being configurable for phase-matching infrared light in a first input wavelength range incident on the first side and light in a first output wavelength range output on the second side, and concurrently, the second up-conversion channel being configurable for phase-matching infrared light in a second input wavelength range incident on the first side into light in a second output wavelength range output on the second side, a demultiplexer configured for demultiplexing light in the first up-conversion channel and light in the second up-conversion channel, the demultiplexer being located on the first side of the wavelength converter system, and a spatially resolved detector arranged in the image plane to detect light in the first output wavelength range and second output wavelength range output of the wavelength converter system.

2. The spectrometer according to claim 1, wherein the first input wavelength range is in the range of 1.5 µm-300 µm, 2 µm-5 µm, 5-10 µm, 10 µm-30 µm, or 30 µm-300 µm.

3. The spectrometer according to claim 1, wherein the first output wavelength range is in the range of 0.3 µm-1.2 µm, 0.8 µm-2.2 µm, 0.4 µm-1.1 µm, 0.9 µm-2.0 µm, 0.45 µm-0.7 µm, or 1.0 µm-1.8 µm.

4. The spectrometer according to claim 1, wherein the first output wavelength range and the second output wavelength range substantially coincide.

5. The spectrometer according to claim 1, wherein the wavelength converter system is a continuous wave CW converter system.

6. The spectrometer according to claim 1, wherein the wavelength up-conversion channels are arranged in parallel.

7. The spectrometer according to claim 1, wherein the wavelength up-conversion channels are arranged in series.

8. The spectrometer according to claim 1, wherein the wavelength converter system comprises a mixing laser configured for generating mixing laser light within the nonlinear material, the mixing laser light having a mixing laser wavelength, wherein the nonlinear material is configurable to phase-match the mixing laser wavelength, the first input wavelength range and the first output wavelength range, thereby forming the first wavelength up-conversion channel.

9. The spectrometer according to claim 8, wherein the difference in phase-matching condition between the first and the second up-conversion channels are achieved by one or more of the following: a difference in propagation angle of the mixing laser relative to a crystal axis of the nonlinear crystal, a different state of polarization, or a different quasi-phase matching.

10. The spectrometer according to claim 1, wherein the spatially resolved detector comprises a two-dimensional detector array.

11. The spectrometer according to claim 1, wherein the spatially resolved detector comprises a linear detector array.

12. A method of detecting a spectral distribution of input light within an extended input wavelength range, the method comprising:

providing at least a first and a second wavelength up-conversion channel, the first wavelength up-conversion channel being configured for phase-matching a first input wavelength range and enabling wavelength conversion of the first input wavelength range into a first output wavelength range, and the second wavelength up-conversion channel being concurrently configured for phase-matching a second input wavelength range and enabling wavelength conversion of the second input wavelength range into a second output wavelength range, converting light in a first sub-range of the extended input wavelength range comprising wavelengths in the first input wavelength range into a first output signal in the first wavelength up-conversion channel, and converting light in a second sub-range of the extended input wavelength range comprising wavelengths in the second input wavelength range into a second output signal in the second wavelength up-conversion channel, detecting a spatial intensity distribution of the first output signal and the second output signal, respectively, with a spatially resolved detector, and calculating the spectral distribution in the first sub-range from the detected spatial intensity distribution of the first output signal, and calculating the spectral distribution in the second sub-range from the detected spatial intensity distribution of the second output signal.

13. The method according to claim 12, wherein the method further comprises demultiplexing light in the first sub-range and in the second sub-range so that light in the first sub-range is selectively coupled to the first wavelength up-conversion channel, and light in the second sub-range is selectively coupled to the second wavelength up-conversion channel.

14. The method according to claim 12, wherein the method further comprises demultiplexing the first output signal and the second output signal so that the output signals are directed to separate detector regions.

* * * * *